United States Patent [19]

Hobbs et al.

[11] 4,240,540

[45] Dec. 23, 1980

[54] GATING METHOD AND APPARATUS

[75] Inventors: John N. Hobbs, Freemansburg; Richard B. Hawkes, Easton, both of Pa.

[73] Assignee: Harris Corporation, Cleveland, Ohio

[21] Appl. No.: 864,234

[22] Filed: Dec. 27, 1977

[51] Int. Cl.³ .............................................. B65G 37/00
[52] U.S. Cl. ................................... 198/492; 198/451; 198/726
[58] Field of Search .............................. 198/356–358, 198/447, 451, 460, 461, 466, 469, 470, 491, 492, 502, 572, 575, 577, 855–857, 425, 726, 626

[56] References Cited

U.S. PATENT DOCUMENTS 3,938,650  2/1976  Holt ..................................... 198/425

Primary Examiner—Joseph E. Valenza

[57] ABSTRACT

Method and apparatus for the gating of piles of magazines from an input conveyor to a trimmer infeed conveyor. A pile is fed to a gating conveyor and blocked at the entrance thereto by a pair of gating pins. The gating pins and the gating conveyor are then driven together with the pins moving at a higher speed than the conveyor. This releases the pile and moves it toward the trimmer infeed conveyor. A second pair of gating pins behind the first pair and moving at the same speed overtakes the magazine pile from the rear and pushes it from the end of the gating conveyor onto the trimmer infeed conveyor.

6 Claims, 6 Drawing Figures

GATING METHOD AND APPARATUS

BACKGROUND OF THE INVENTION

This invention relates to the handling of articles such as magazines, periodicals, or the like and more particularly to apparatus and method for receiving piles of magazines from an input line such as a conveyor and gating them to an output line such as a trimmer infeed conveyor.

In the art of making magazines and the like, the individual magazines are formed by assembling signatures and conveying them to a binder for binding into magazines. The magazines are then stacked into piles and the piles are conveyed to a trimmer for further operations thereon. In copending application Ser. No. 864,235, filed Dec. 27, 1977, assigned to the Assignee of this application, there is disclosed a system for accumulating magazine piles from a binder and feeding them in a controlled manner to the trimmer infeed conveyor.

As described in said copending application, magazine piles are directed into a number of parallel columns between a delivery conveyor from a binder and a trimmer infeed conveyor. Piles are accumulated in the columns to an extent determined by the speed and continuity of operation of the binder and trimmer. The present invention involves an apparatus and method for gating the leading pile of such an accumulated column of piles onto the trimmer infeed conveyor.

SUMMARY OF THE INVENTION

According to the present invention, the leading pile of a horizontal column of magazine piles is blocked at the entrance to a gating conveyor by one or more movable gating pins positioned adjacent the conveyor. At the appropriate time, the gating conveyor and pins are moved with the pins moving faster than the conveyor. The pile is thereby released and conveyed toward the trimmer infeed conveyor. One or more additional gating pins approach the pile from the rear and push it onto the infeed conveyor.

Apparatus embodying the present invention for gating an article from a supply line to an output line includes a conveyor, a pair of gating pins and means mounting the gating pins for movement adjacent the conveyor in a path parallel thereto. Means are provided for driving the pin mounting means and means are provided for driving the conveyor at a speed lower than that of the pin mounting means. A first of the gating pins is positioned at rest at the entrance to the conveyor in position to block movement of an article on the conveyor. The second of the pins is speed from the first by an amount such that the second pin at its speed of travel will overtake an article on the conveyor released by movement of the first pin as the article reaches the end of the conveyor.

A method embodying the present invention for gating an article from a supply line to an output line includes the steps of providing a path for an article to the output line and blocking the article at the entrance to the path. Further steps include releasing the article, moving the path to move the article toward the output line and pushing the article from the end of the path onto the output line.

DESCRIPTION OF A PREFERRED EMBODIMENT

In the system disclosed in the aforementioned copending patent application Ser. No. 864,235, filed Dec. 27, 1977 magazine piles are conveyed to one or more gates positioned side by side. The piles are gated onto a trimmer infeed conveyor in a controlled manner.

Figure 1:
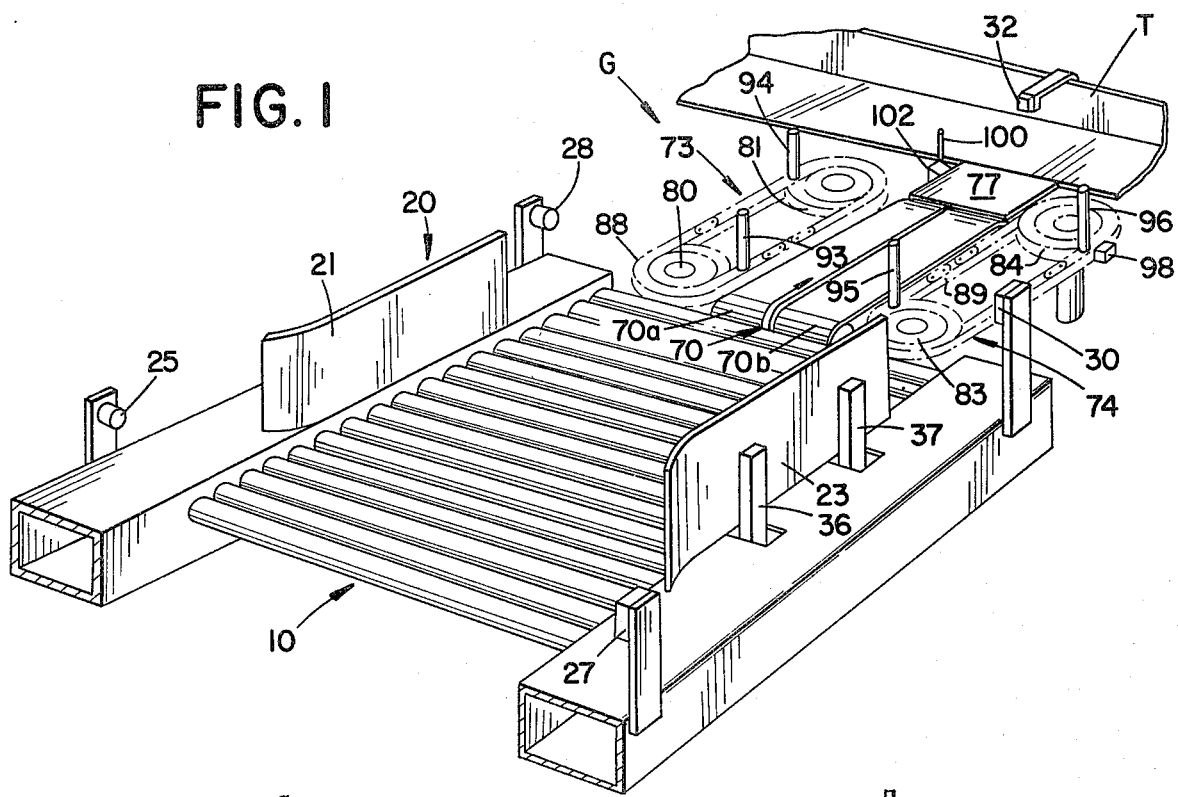
FIG. 1 is a perspective view of a gate apparatus embodying the present invention between an input conveyor and a trimmer infeed conveyor.

A gate G such as those employed in said copending application is shown in FIG. 1 between an input conveyor section 10 and a trimmer infeed conveyor T. Typically, three gates are employed side by side, one at the end of each of three conveyor lanes. It will be appreciated therefore that the following description applies to any additional gates as well as to gate G.

Magazine piles are fed to gate G and are blocked at the entrance thereto. When blocked piles have accumulated to a predetermined position upstream and a pile is detected in position at the entrance to the gate a gating cycle is initiated. A restrictor is first actuated to prevent further advance of succeeding piles and the gate is then enabled to feed the leading pile onto the trimmer infeed conveyor T. At the end of the gating sequence the restrictor is retracted and the piles are permitted to advance so that the procedure can be repeated.

As shown in FIG. 1, a restrictor 20 is mounted at the end of conveyor section 10 and includes a pair of restrictor plates 21, 23 supported on opposite sides of conveyor section 10. Each restrictor plate has a high friction inner surface of rubber or the like. The restrictor plates may be advanced toward each other to contact and restrain a horizontal column of from one to three magazine piles.

A photodetector 25 is mounted at the entrance to restrictor 20 and is aimed at a reflection target 27 on the opposite side of conveyor section 10. A second photodetector 28 is mounted at the entrance to gate G opposite a reflective target 30. A third photodetector 32 is mounted above the surface of trimmer infeed conveyor T opposite a reflective target beneath a slot (not shown) in the surface of the conveyor. Each of the photodetectors 25, 28 and 32 is a photodetector relay provided with one or more sets of contacts. The contacts of detectors 25 and 28 are actuated when a magazine pile is between the detector element and the respective target while those of detector 32 are actuated in the absence of a magazine pile.

The photodetectors 25, 28 and 32 are preferably TR-3 modules available from Microswitch, Inc.

Figure 2:
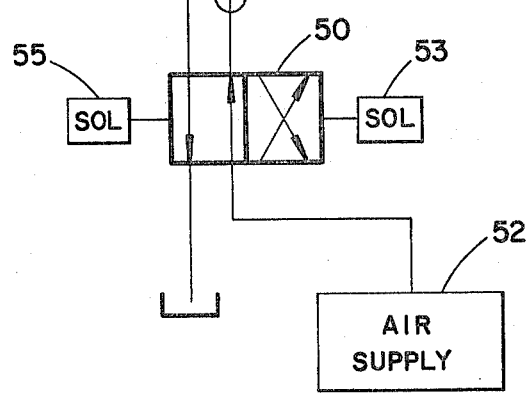
FIG. 2 is a diagrammatic end view of a restrictor employed with the gate apparatus shown in FIG. 1.

As shown in FIGS. 1 and 2, each restrictor plate 21, 23 is supported by a pair of vertical bars 36, 37 for plate 23 and 39 for plate 21, the remaining bar not being shown. These bars extend through openings in the frame of conveyor section 10 and through a linkage to a pneumatic operating mechanism. FIG. 2 shows the arrangement for bars 36 and 39 only, it being understood that the arrangement for the remaining bars is the same. Each bar 36, 39 is connected to a piston 41, 43 which is slidable in a cylinder 47. Cylinder 47 is connected at each end and its center to a penumatic valve 50 which in turn is connected to a source of pneumatic pressure 52. Valve 50 is controlled by an advance solenoid 53 and a retract solenoid 55. Energizing advance solenoid 53 causes valve 50 to direct air from source 52 to both ends of pneumatic cylinder 47 thereby urging pistons 41, 43 and restrictor plates 21, 23 toward each other to engage opposite sides of a column of magazine piles. Energizing solenoid 55 causes valve 50 to direct air from source 52 to the center of pneumatic cylinder 47 and thereby retract restrictor plates 21, 23 to their normal standby positions.

Figure 3:
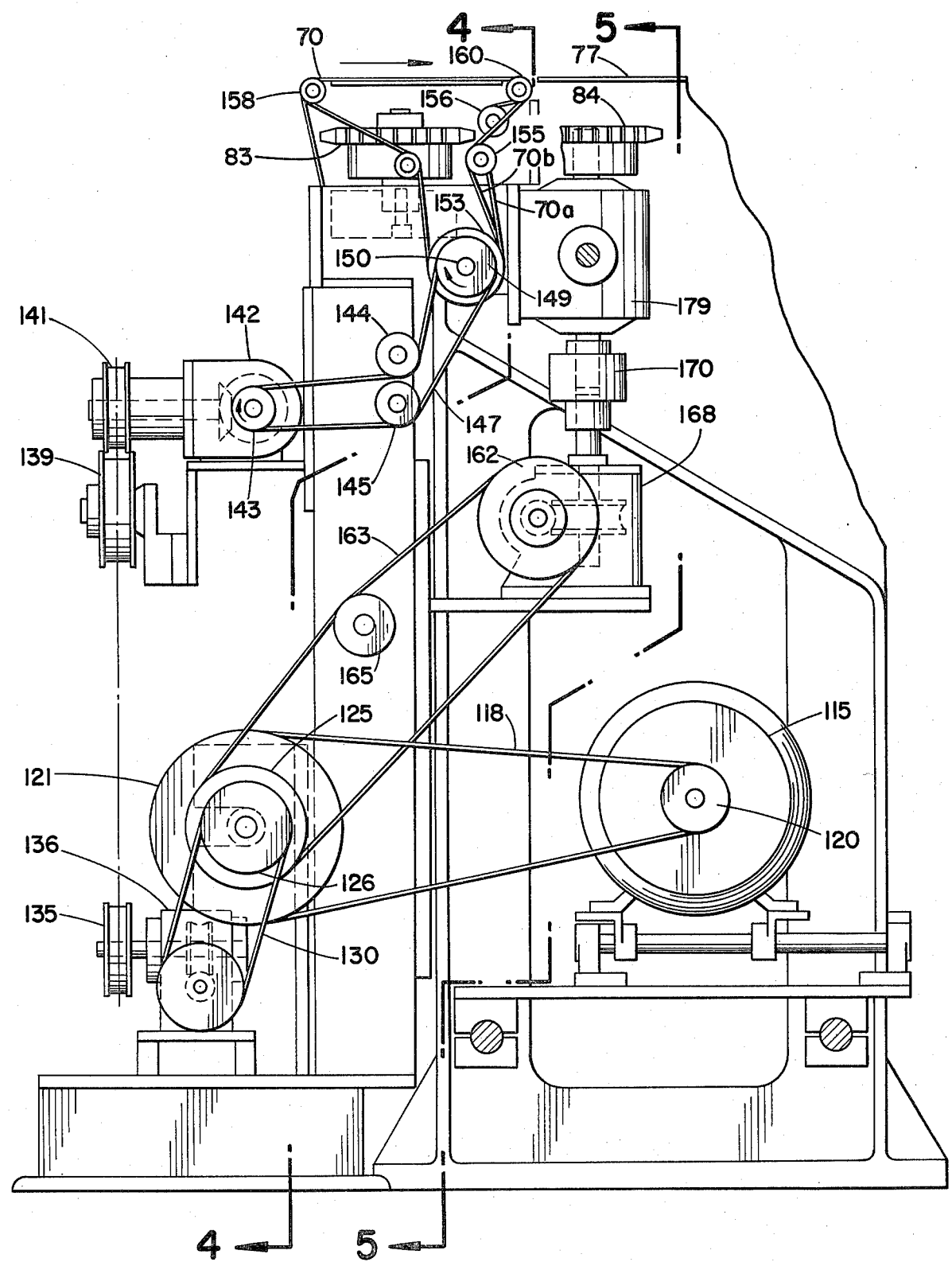
FIG. 3 is a side elevational view of the gate apparatus.
Figure 4:
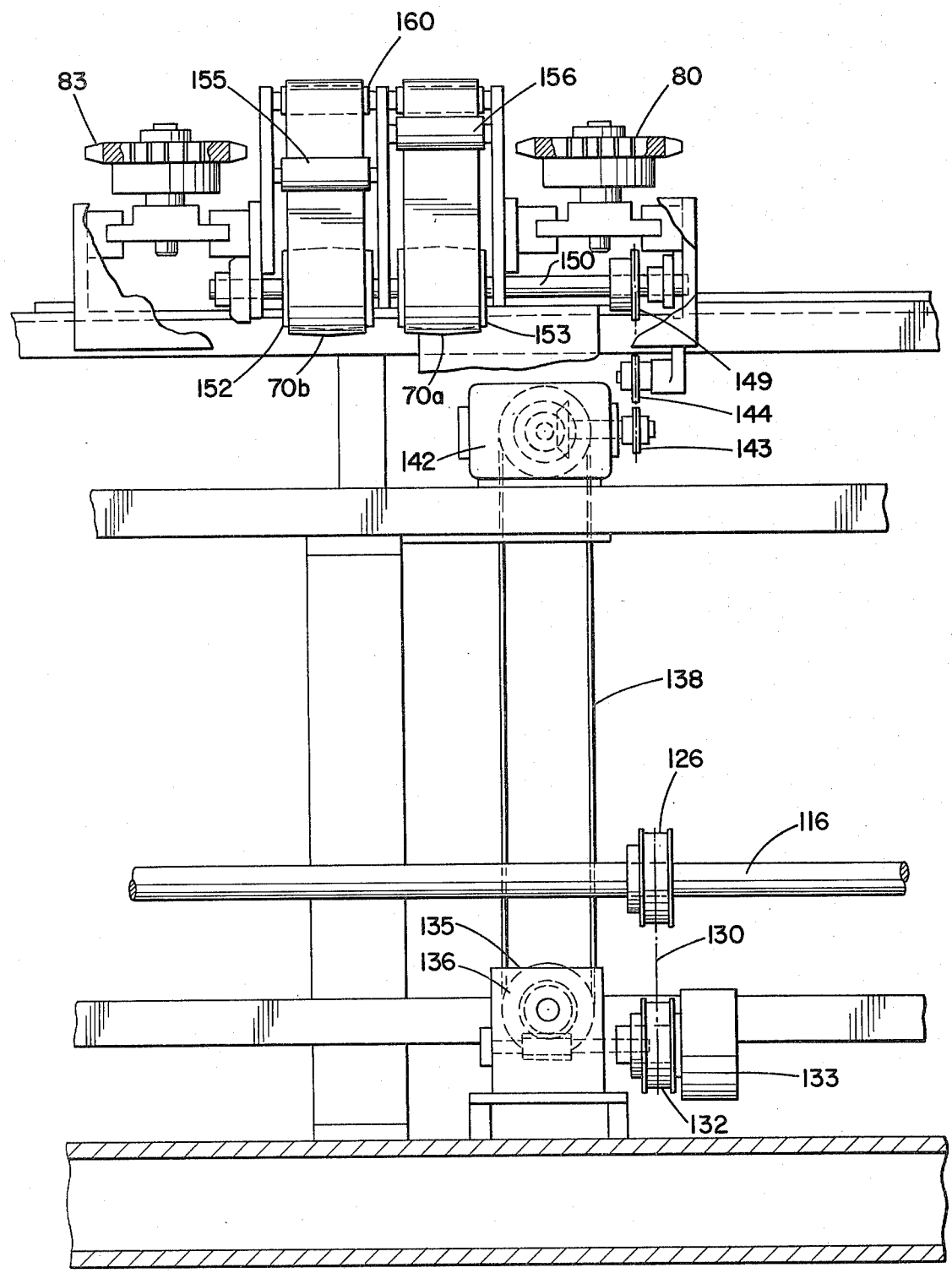
FIG. 4 is a view of the gate apparatus along the line 4—4 of FIG. 3.
Figure 5:
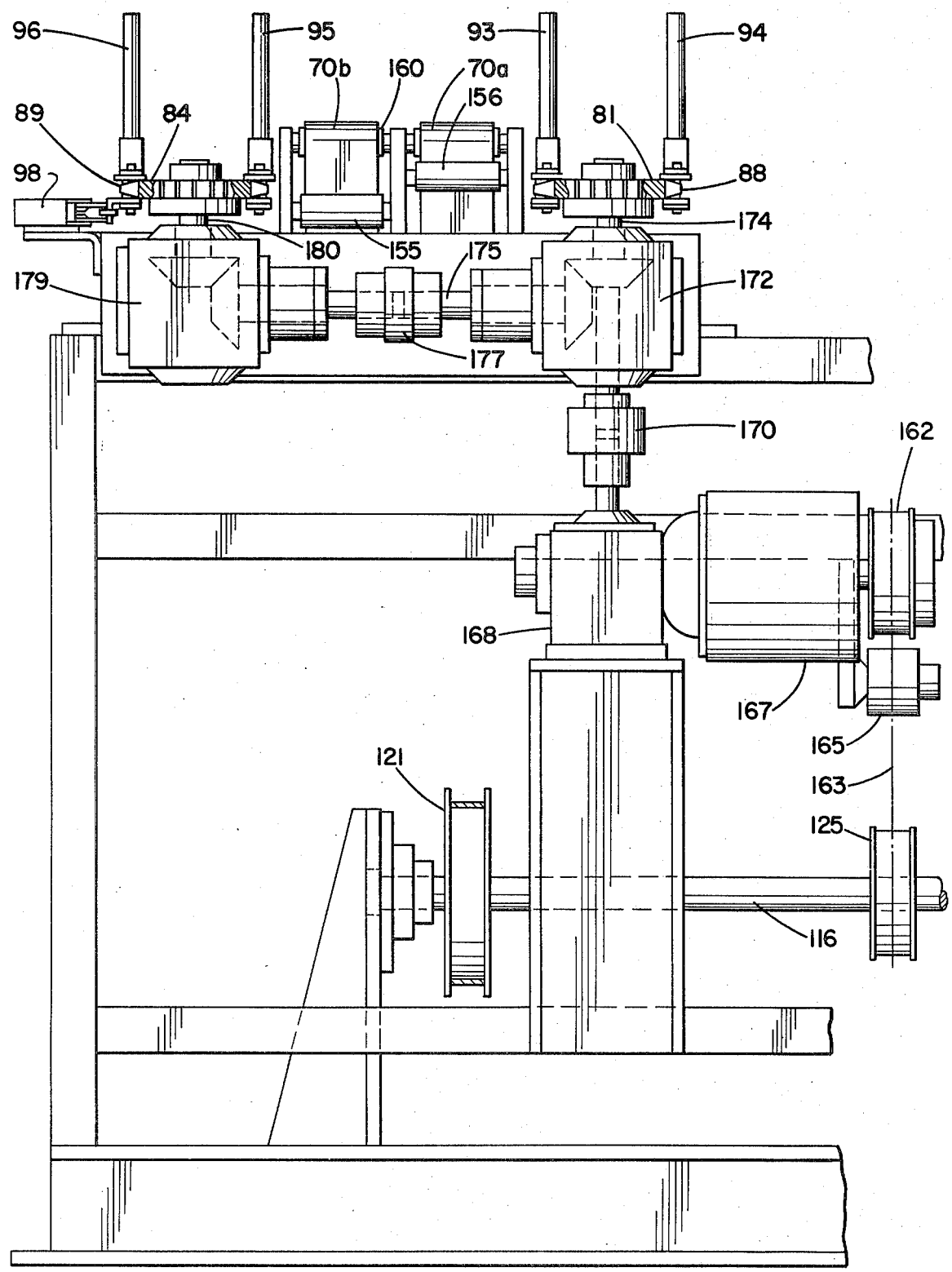
FIG. 5 is a view of the gate apparatus along the line 5—5 of FIG. 3.

Referring now to FIGS. 1 and 3 to 5, gate G includes a central belt conveyor 70 flanked on each side by a gating pin drive mechanism generally indicated at 73 and 74. Conveyor 70 runs to a shelf 77 which leads to the trimmer infeed conveyor T. Each gating pin drive mechanism 73, 74 includes a pair of sprockets, identified as 80 and 81 for mechanism 73 and as 83 and 84 for mechanism 74. Each set of sprockets drives a chain 88, 89. Each chain carries a pair of gating pins identified as 93 and 94 for mechanism 73 and 95 and 96 for mechanism 74. Chains 88 and 89 are somewhat below the surface of conveyor 70 while gating pins 93 to 96 extend upwardly above the conveyor surface as shown in FIGS. 3 to 5. The distance between gating pins 93 and 95 is less than the width of a magazine pile so that these pins stop piles at the entrance to the gate.

At the home position of the gating pins, a normally closed switch 98 is held open by pin 96 for a purpose which will be described below. A feed pin 100 on the trimmer infeed conveyor T closes a switch 102 to provide a synchronizing signal to the system when the trimmer infeed conveyor feed pins are in the proper position to receive a magazine pile from gate G.

Gate G is powered by a drive motor 115 (FIG. 3) which rotates a drive shaft 116 (FIGS. 4 and 5) through a belt 118 connected between sheaves 120 and 121. Drive shaft 116 in turn drives a pair of sheaves 125 and 126 for gate G. Sheave 125 transmits the driving force for the gating pin drive mechanisms 73 and 74 while sheave 126 transmits the driving force for the conveyor 70. Where more than one gate is employed drive motor 115 and drive shaft 116 are common to all. In that case sheaves corresponding to sheaves 125 and 126 transmit driving force from shaft 116 to the gating pin drive mechanisms and gate conveyors for the remaining gates in the same manner as described below for sheaves 125 and 126.

The drive path from sheave 126 to conveyor 70 is, as shown in FIGS. 3 and 4, through a belt 130 to a sheave 132 connected to the input element of an electrically operated clutch 133. The output shaft of clutch 133 drives a sheave 135 through a worm gear box 136. Sheave 135 is connected by means of a belt 138 through idler 139 to a sheave 141 which is connected to the input of a worm gear box 142. A sprocket 143 mounted on the output shaft of gear box 142 is connected by means of idlers 144 and 145 and a belt 147 to a sprocket 149. Sprocket 149 is mounted upon a shaft 150 which also supports a pair of drive pulleys 152 and 153. These pulleys drive conveyor belt sections 70a and 70b which are supported by take-up pulleys 155 and 156 and rollers 158, 160.

The drive path from sheave 125 to gating pin drive mechanisms 73, 74 incldues a sheave 162 which is driven by a belt 163 through an idler 165. Sheave 162 is connected to the input shaft of a combined clutch and brake unit 167 which has its output shaft connected to a worm gear box 168. The output shaft of gear box 168 is connected through a coupling 170 to another gear box 172. Gear box 172 has a pair of output shafts 174 and 175. Shaft 174 is connected to and drives sprocket 81 which in turn drives chain 88. As shown in FIG. 4, sprocket 80 is an idling sprocket driven by chain 88.

The other output shaft 175 of gear box 172 is connected through a coupling 177 to the input shaft of another gear box 179. The output shaft 180 of gear box 179 is connected to sprocket 84 which drives chain 89. Sprocket 83 (FIG. 4) is, like sprocket 80, merely an idling sprocket and is driven by chain 89. Switch 98 is mounted adjacent sprocket 89 so that it is actuated by gating pin 96 when the pin is at its home position.

The gear ratios for the various gear boxes in the drive path to the conveyor 70 and to the gating pin drive mechanisms 73 and 74 are adjusted such that the speed of travel of gating pins 93 to 96 is higher than the surface speed of belts 70a and 70b for reasons to be described below.

In operation, main drive motor 115 operates continuously and rotates main drive shaft 116 during operation of the system. Conveyor 70 is driven, however, only when clutch 133 is actuated to couple rotation of drive shaft 116 to shaft 150 of drive pulleys 152 and 153 through the various belts and gear boxes described above.

Likewise, the output shaft of gear box 168 (FIG. 5) is driven and drives output shafts 174 and 175 to operate the gating pin drive mechanisms 73 and 74 only when combination brake and clutch unit 167 is energized to release the brake and activate the clutch.

A magazine pile approaching gate G is blocked by gating pins 93 and 95. When the proper conditions for gating have been met, as described below, conveyor 70 is started along with sprockets 81 and 84, which cause gating pins 93 and 95 to move toward the trimmer infeed conveyor T. The magazine pile is carried on conveyor 70 toward the trimmer infeed conveyor. Since the speed of the gating pins is higher than that of conveyor 70 gating pins 93 and 95 move away from the magazine pile while gating pins 94 and 96 approach the pile from the rear. The relative speed of the gating pins and conveyor 70 is such that pins 94 and 96 contact the rear of the magazine pile as it is delivered by conveyor 70 onto surface 77 and push the pile onto trimmer infeed conveyor T. Pins 94 and 96 then proceed to their home positions where pin 96 actuates switch 98. This stops the pins in the home position as described more fully below.

Restrictor 20 is then caused to release the next magazine pile which proceeds to the entrance of gate G. The same sequence is then carried out to gate that pile onto trimmer infeed conveyor T.

Figure 6:
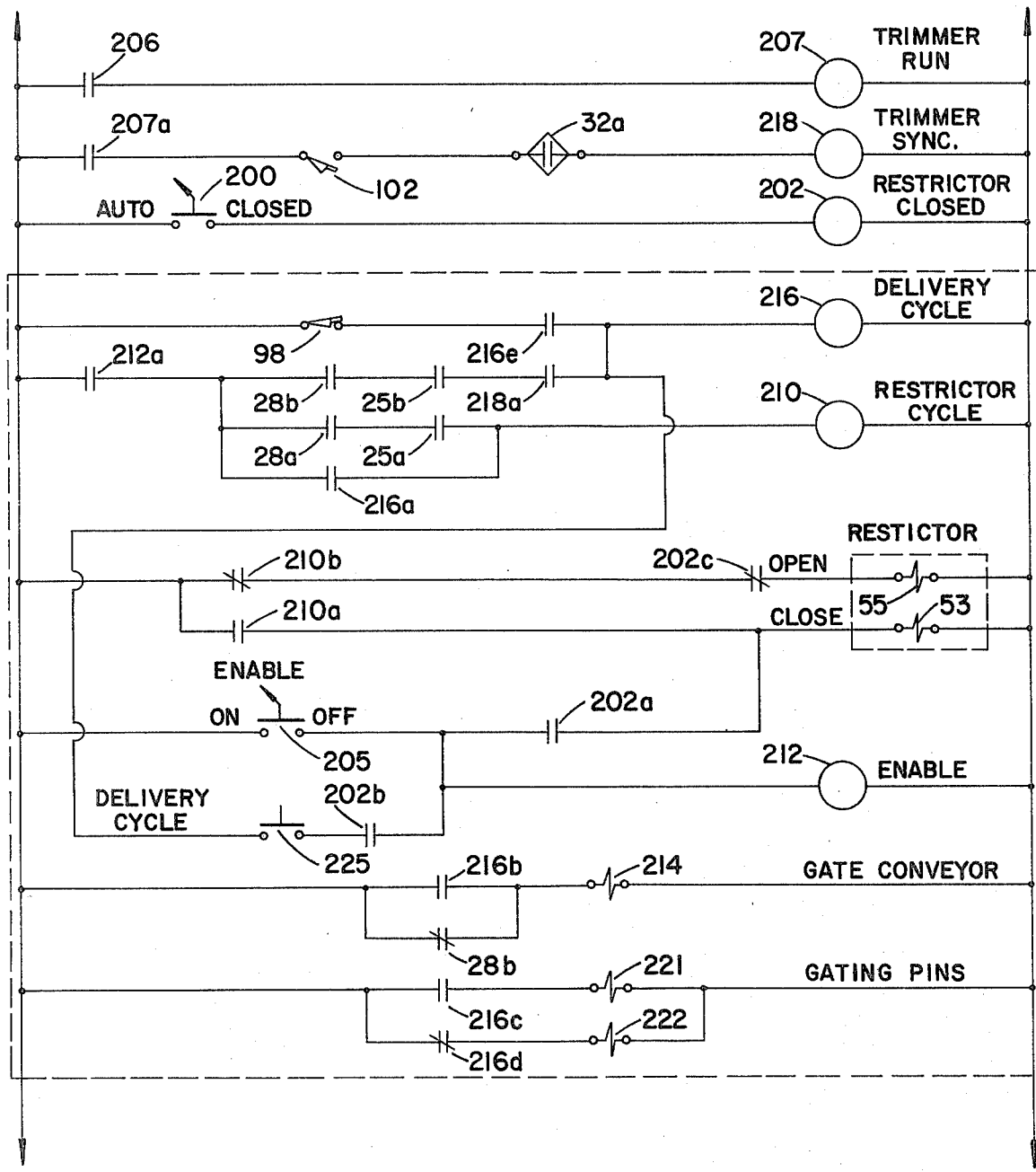
FIG. 6 is a schematic diagram of the control system for the gate apparatus.

The control system for the gate apparatus is shown in FIG. 6. The control system includes the various switches mentioned above along with a number of control relays. The relay coils are indicated by the circles at the right hand side of FIG. 6. A brief indication of the function of each relay is printed alongside the symbol. The relay contacts are identified by the reference numeral for the relay followed by a lower case letter, for example, 207a.

Referring now to FIGS. 1 and 6 for a description of the control system and its operation, restrictor switch 200 will initially be set for automatic restrictor operation so that restrictor relay 202 is not energized. Likewise, the enable switch 205 will be closed energizing enable relay 212. When the trimmer is running, trimmer run switch 206 is closed and actuates trimmer run relay 207.

When photodetector 25 detects the presence of a magazine pile at the entrance to the restrictor at the same time that detector 28 detects a pile in position to be gated, then restrictor cycle relay 210 is actuated through contacts 25a and 28a and through contacts 212a of enable relay 212. Relay 210 actuates restrictor close solenoid 53 through contacts 210a and opens the path to the restrictor open solenoid 55 through contacts 210b. The restrictors are thus closed to restrain the column of magazine piles from advancing during the gating operation.

At about the same time the belt conveyor 70 for gate G is stopped when belt clutch solenoid 214 which controls clutch 133 (FIG. 4) is deenergized by actuation of detector contacts 28b.

Delivery cycle relay 216 is actuated to initiate a delivery cycle as soon as trimmer sync relay 218 is actuated. Relay 218 is enabled when photodetector 32 closes contacts 32a indicating that an open chain space is available on the trimmer infeed conveyor. Relay 218 is actuated when switch 102 is closed by trimmer infeed pin 100 (FIG. 1) indicating that a chain space of the trimmer infeed conveyor is in proper position for receiving a magazine pile from the gate. Trimmer sync relay 218 actuates delivery cycle relay 216 which holds restrictor cycle relay 210 through contact 216a. Relay 216 also actuates belt clutch solenoid 214 which controls clutch 133 and actuates the gating pin clutch solenoid 221 while releasing the gating pin brake solenoid 222. Solenoids 221 and 222 control the combination brake and clutch unit 167 (FIG. 5).

The leading magazine pile is then gated onto trimmer infeed conveyor T in the manner described above. Delivery cycle relay 216 remains actuated through its own contact 216e and through switch 98. Switch 98 is normally closed but is held open by gating pin 96 when the gating pins are at their home positions. During the gating operation switch 98 is closed and opens when gating pin 96 is returned to its home position. This releases relay 216 which deenergizes gating pin clutch solenoid 221 and energizes brake solenoid 222. Restrictor cycle relay 210 is also released to allow the restrictors to return to the open position. This permits the column to advance until the leading pile is stopped by gating pins 93 and 95 and the entire procedure is repeated.

A manual delivery cycle may be obtained by placing restrictor switch 200 in the restrictor closed position which actuates relay 202 and relay 202 actuates restrictor close solenoid 53. A manual delivery cycle can then be initiated by pressing manual delivery cycle switch 225. This actuates relay 216 which in turn actuates belt clutch solenoid 214 and gating pin clutch solenoid 221 while deenergizing brake solenoid 222. The pile at the entrance to gate G is thus gated onto the trimmer infeed conveyor T in the manner described above.

When the gating pins have returned to their home position, switch 98 will open and release delivery cycle relay 216. Restrictor switch 200 may then be returned to the automatic position. Restrictor close solenoid 53 is released and restrictor open solenoid 55 is actuated to open the restrictor.

What is claimed is:

1. Apparatus for gating articles from a supply line to an output line, said apparatus comprising a conveyor interposed between said supply line and said output line, a pair of gating pins, pin mounting means mounting said gating pins for successive movement adjacent said conveyor in a path parallel thereto, means for cyclically driving said pin mounting means so as to move said gating pins successively along said path parallel to said conveyor, means for driving said conveyor at a speed lower than that of said pin mounting means, said pin mounting means being adapted to position said pair of gating pins in a first position with a first of said gating pins at rest at the entrance to said conveyor to block movement of an article onto said conveyor, and the second of said gating pins being spaced along said pin mounting means from the first of said gating pins such that said first gating pin releases from and moves away from the article and said second gating pin at its speed of travel with said pin mounting means overtakes the article on said conveyor released by movement of said first pin and pushes said article onto said output line, said pin mounting means being further driven in each cycle to thereafter move said pair of gating pins to said first position with said first gating pin blocking a succeeding article to be gated from the supply line to the output line.

2. Apparatus as defined in claim 1 wherein said mounting means supports said pair of gating pins on one side of said conveyor, and further comprising a second pair of gating pins, second pin mounting means mounting said second pair of gating pins on the opposite said of said conveyor for movement adjacent said conveyor in a path parallel thereto while supporting said second pair of gating pins above the level of said conveyor, means for driving said second pin mounting means in synchronism with said pin mounting means, said second pin mounting means being adapted to position said second pair of gating pins in a first position with a first pin of said second pair at rest at the entrance to said conveyor in position to block movement of an article onto said conveyor, the second pin of said second pair being spaced from the first pin of said second pair such that said first pin releases from and moves away from said article and second pin at its speed of travel will overtake said article on said conveyor released by movement of said first pin as said article reaches the end of said conveyor, said second pin mounting means being adapted to thereafter move said second pair of gating pins to said first position.

3. Apparatus as claimed in claim 1 wherein said mounting means for said pair of gating pins comprises a pair of sprockets and a chain carrying said gating pins and driven by said sprockets in a generally elliptical path.

4. Apparatus as claimed in claim 1 wherein said driving means for said conveyor comprises a motor, a clutch and speed reducing means between said conveyor and said motor, and means for operating said clutch to couple said motor to said conveyor.

5. Apparatus as claimed in claim 4 wherein said driving means for said pin mounting means comprises said motor, a second clutch between said pin mounting means and said motor, a brake for said pin mounting means, and means for operating said second clutch and said brake to engage one while releasing the other.

6. An apparatus as claimed in claim 1 further comprising restrictor means upstream of said conveyor for restraining succeeding articles on command during gating of a moving article by applying pressure uniformly to opposite edges of the succeeding articles.

* * * * *